US009911324B2

(12) United States Patent
Wu

(10) Patent No.: US 9,911,324 B2
(45) Date of Patent: *Mar. 6, 2018

(54) SYSTEMS, METHODS AND MEDIA FOR REMOTE CONTROL OF ELECTRONIC DEVICES USING A PROXIMITY SENSOR

(71) Applicant: Google Inc., Mountain View, CA (US)

(72) Inventor: Honglei Wu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,648

(22) Filed: Jul. 21, 2017

(65) Prior Publication Data

US 2017/0323558 A1 Nov. 9, 2017

Related U.S. Application Data

(63) Continuation of application No. 14/873,760, filed on Oct. 2, 2015, now Pat. No. 9,715,826.

(51) Int. Cl.
*H04B 10/00* (2013.01)
*G08C 23/02* (2006.01)

(52) U.S. Cl.
CPC ......... *G08C 23/02* (2013.01); *G08C 2201/91* (2013.01)

(58) Field of Classification Search
CPC ............................ G08C 23/02; G08C 2201/91
USPC .......................................................... 398/106
See application file for complete search history.

(56) References Cited

U.S. PATENT DOCUMENTS

| | | | |
|---|---|---|---|
| 2011/0063224 | A1 | 3/2011 | Vexo et al. |
| 2012/0129580 | A1 | 5/2012 | Tam |
| 2012/0295665 | A1 | 11/2012 | Pantfoerder |
| 2013/0177318 | A1 | 7/2013 | Jubilo et al. |
| 2013/0276028 | A1 | 10/2013 | Britt, Jr. |
| 2015/0125154 | A1 | 5/2015 | Chun |

OTHER PUBLICATIONS

Notice of Allowance dated Mar. 21, 2017 in U.S. Appl. No. 14/873,760.

*Primary Examiner* — Juan A Torres

(74) *Attorney, Agent, or Firm* — Byrne Poh LLP

(57) ABSTRACT

Systems, methods and media for remote control of electronic devices using a proximity sensor are provided. In some implementations, the system comprises: a proximity sensor comprising an infrared emitter and an infrared detector, wherein the proximity sensor is configured to emit infrared light having specific properties using the infrared emitter and sense reflected light having the specific properties using the infrared detector to determine proximity of the sensor to an object; and a hardware processor that is programmed to: receive a user instruction to cause a command to be issued to control an electronic device; determine a code to be transmitted that corresponds to the command from a plurality of codes associated with the electronic device; and provide at least one signal to the proximity sensor to cause the proximity sensor to emit an infrared signal corresponding to the code instead of emitting infrared light having the specific properties.

21 Claims, 5 Drawing Sheets

SYSTEMS, METHODS AND MEDIA FOR REMOTE CONTROL OF ELECTRONIC DEVICES USING A PROXIMITY SENSOR

CROSS-REFERENCE TO RELATED APPLICATIONS

This application is a continuation of U.S. patent application Ser. No. 14/873,760, filed Oct. 2, 2015, which is hereby incorporated by reference herein in its entirety.

TECHNICAL FIELD

The disclosed subject matter relates to methods, systems, and media for remote control of electronic devices using a proximity sensor.

BACKGROUND

Many consumers use multiple devices that can be controlled via remote control using infrared signals. Different devices generally have different dedicated remote controls, which may or may not also be configurable to control one or more other devices. For example, many remote controls for cable set-top boxes can be configured to control certain functions of many televisions, such as power, volume, etc., in addition to controlling functions of the cable set-top box. However, such programmable remote controls can be difficult to program and may not provide all of the functionality that a dedicated remote control would provide, and multiple remote controls that are used infrequently can be misplaced or look messy.

Many of these same consumers have mobile devices, such as smartphones or tablet computers, that could be more easily programmed to control various devices, but they lack an integrated infrared blaster that can be used to transmit the infrared signal required to control these various devices. While many mobile devices have a proximity sensor that emits infrared light, these conventional proximity sensors are generally hardwired to emit light having one particular modulation pattern, and therefore cannot be used to emit remote control signals for controlling electronic devices.

Accordingly, it is desirable to provide systems, methods and media for remote control of electronic devices using a proximity sensor.

SUMMARY

In accordance with various implementations of the disclosed subject matter, methods, systems, and media for remote control of electronic devices using a proximity sensor.

In accordance with some implementations of the disclosed subject matter, a system for remote control of electronic devices is provided, the system comprising: a proximity sensor comprising an infrared emitter and an infrared detector, wherein the proximity sensor is configured to emit infrared light having specific properties using the infrared emitter and sense reflected light having the specific properties using the infrared detector to determine proximity of the sensor to an object; and a hardware processor that is programmed to: receive a user instruction to cause a command to be issued to control an electronic device; determine a code to be transmitted that corresponds to the command from a plurality of codes associated with the electronic device; and provide at least one signal to the proximity sensor to cause the proximity sensor to emit an infrared signal corresponding to the code instead of emitting infrared light having the specific properties.

In accordance with some implementations of the disclosed subject matter, a method for remote control of electronic devices is provided, the method comprising: receiving, using a hardware processor, a user instruction to cause a command to be issued to control an electronic device; determining a code to be transmitted that corresponds to the command from a plurality of codes associated with the electronic device; and providing at least one signal to a proximity sensor to cause the proximity sensor to emit an infrared signal corresponding to the code instead of emitting infrared light having specific properties used in detecting proximity, wherein the proximity sensor comprises an infrared emitter and an infrared detector and is configured to emit infrared light having the specific properties using the infrared emitter and sense reflected light having the specific properties using the infrared detector to determine proximity of the sensor to an object.

In accordance with some implementations of the disclosed subject matter, a non-transitory computer-readable medium containing computer executable instructions that, when executed by a processor, cause the processor to perform a method for remote control of electronic devices is provided, the method comprising: receiving a user instruction to cause a command to be issued to control an electronic device; determining a code to be transmitted that corresponds to the command from a plurality of codes associated with the electronic device; and providing at least one signal to a proximity sensor to cause the proximity sensor to emit an infrared signal corresponding to the code instead of emitting infrared light having specific properties used in detecting proximity, wherein the proximity sensor comprises an infrared emitter and an infrared detector and is configured to emit infrared light having the specific properties using the infrared emitter and sense reflected light having the specific properties using the infrared detector to determine proximity of the sensor to an object.

In accordance with some implementations of the disclosed subject matter, a system for remote control of electronic devices is provided, the system comprising: proximity sensing means for sensing a proximity of an object comprising means for emitting infrared light and means for detecting infrared light, wherein the proximity sensing means is configured to emit infrared light having specific properties using the means for emitting infrared light and sense reflected light having the specific properties using the means for detecting infrared light to determine the proximity of the object; means for receiving a user instruction to cause a command to be issued to control an electronic device; means for determining a code to be transmitted that corresponds to the command from a plurality of codes associated with the electronic device; and means for providing at least one signal to the proximity sensing means to cause the proximity sensing means to emit an infrared signal corresponding to the code instead of emitting infrared light having the specific properties used in detecting proximity.

In some implementations, the proximity sensing means further comprises control means that causes the means for emitting infrared light to emit the infrared light having the specific properties in response to a power supply signal being supplied to the proximity sensing means.

In some implementations, the proximity sensing means further comprises a connection means for receiving an override signal that is used to control the means for emitting infrared light, and wherein the at least one signal provided to the proximity sensing means includes the override signal.

In some implementations, the proximity sensing means is incorporated in a user device, and the system further comprises means for providing a user interface on a display of the user device that provides instructions for a user indicating how to position the user device to aim the proximity sensor at the electronic device.

In some implementations, the system further comprises: means for receiving the plurality of codes from a remote server; and means for causing the plurality of codes to be stored in a memory.

In some implementations, the means for emitting infrared light comprises a light emitting diode.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
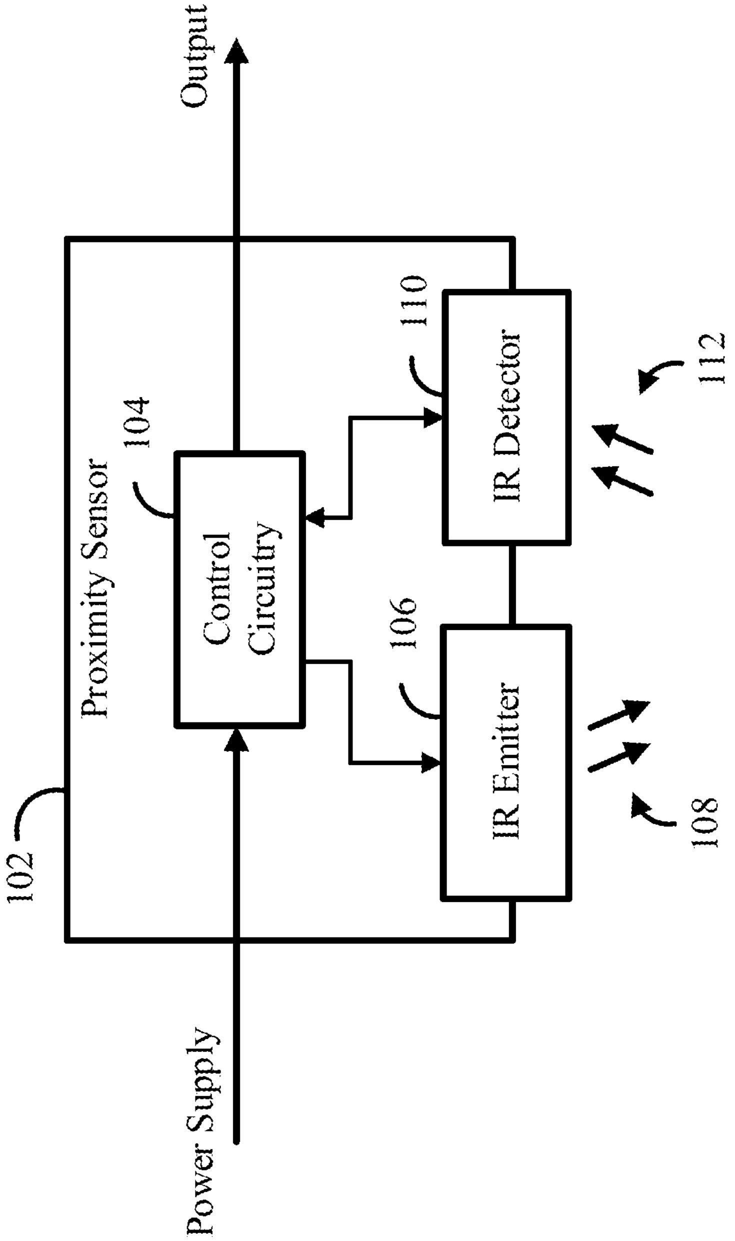
FIG. 1 shows an example of a proximity sensor having internal control circuitry.

In accordance with various implementations, mechanisms (which can include methods, systems, and/or media) for remote control of electronic devices using a proximity sensor are provided.

In some implementations, the mechanisms described herein can cause a proximity sensor of a user device (e.g., a smartphone, a tablet computer, etc.) to output infrared (IR) signals corresponding to one or more codes that can be used to control the functions of an electronic device (e.g., a television, a set-top box, an AV receiver, a ceiling fan, etc.). For example, the mechanisms described herein can use a proximity sensor of a smartphone that is normally used for determining whether the smartphone screen is near an object (such as the user's face) to transmit an IR signal for controlling a set-top box.

In some implementations, a user device configured in accordance with the mechanisms described herein can include a proximity sensor with an infrared emitter that can be controlled by the user device, in addition to (or as an alternative to) being controllable by internal control circuitry of the proximity sensor. For example, the proximity sensor can normally be used by the device for determining whether the user device is adjacent to an object, such as a user's face, a tabletop, etc., and can also be used for transmitting infrared remote control codes. As another example, the proximity sensor can be part of a 3D camera that senses the distance to objects in a scene by emitting infrared light toward the scene and determining the distances based on reflected infrared light from the scene. In such an example, the infrared emitter for the 3D camera can also be used to transmit infrared remote control codes.

In some implementations, a proximity sensor configured in accordance with the mechanisms described herein can include a connection for receiving an override signal from the user device in which it is incorporated. In such implementations, this override signal can, for example, facilitate direct control over the infrared emitter of the proximity sensor by the user device, rather than the internal control circuitry of the proximity sensor controlling the infrared emitter to emit a signal configured for proximity sensing.

In some implementations, a user device configured in accordance with the mechanisms described herein can download and/or access codes for controlling any suitable electronic device from a server that stores the codes. Additionally, in some implementations, such a user device can receive user input indicating a command that is to be issued and/or an electronic device that is to be controlled, and can use stored and/or accessed information about a code corresponding to that command to control the infrared emitter of the proximity detector to transmit the code corresponding to the command. For example, a smartphone with a proximity sensor configured in accordance with the mechanisms described herein can execute an application for causing a proximity sensor of the device to transmit remote control signals for electronic devices, such as a set-top box. In such an example, the application can receive user input indicating that a command is to be issued to the set-top box to change the channel tuned by the set-top box, and can control signals applied to the proximity sensor to cause the proximity sensor to emit infrared light corresponding to the code that causes that set-top box to change the channel.

FIG. 1 shows an example of a proximity sensor having internal control circuitry. As shown in FIG. 1, a proximity sensor 102 can include control circuitry 104 that receives a power supply voltage. The power supply voltage can be provided from any suitable source and can be, for example, a 5 volt signal. Control circuitry 104 can use the power supply voltage to control operation of an infrared (IR) emitter 106, such as an infrared light emitting diode. Control circuitry 104 can include, for example, an oscillator that can be used to drive IR emitter 106 at a particular modulation frequency to emit light 108 at a particular modulation frequency. Control circuitry 104 can control an infrared (IR) detector 110 to sense infrared light 112 emitted by IR emitter 106 that has been reflected back toward proximity sensor 102. IR detector 110 and/or control circuitry 104 can provide an output signal based on the amount of light emitted by IR emitter 106 that is received at IR detector 110.

Figure 2:
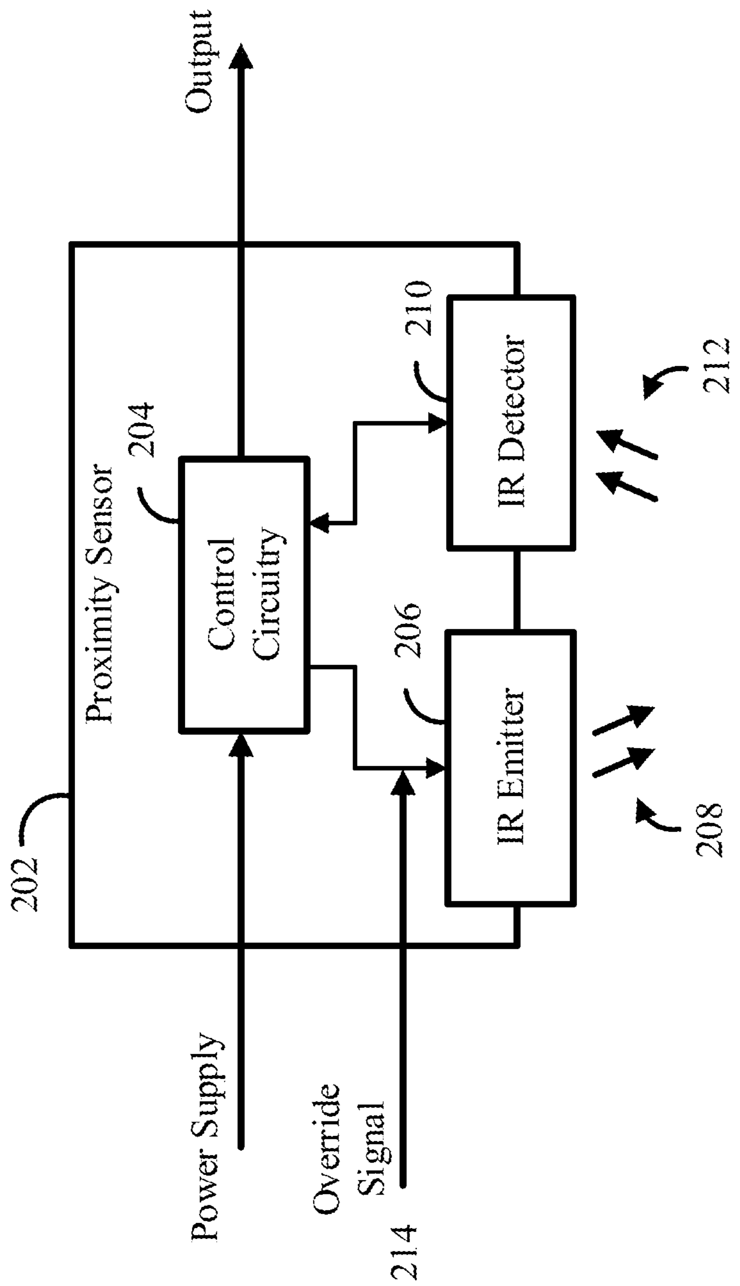
FIG. 2 shows an example of a proximity sensor for use in remote control of electronic devices in accordance with some implementations of the disclosed subject matter.

FIG. 2 shows an example of a proximity sensor 202 for use in remote control of electronic devices in accordance with some implementations of the disclosed subject matter. As shown in FIG. 2, proximity sensor 202 can include internal control circuitry 204 that receives a power supply voltage, such as a 5 volt signal supplied from a device in which proximity sensor 202 is incorporated. In some implementations, control circuitry 204 can use the power supply voltage and an oscillator to control operation of an infrared (IR) emitter 206, such as an infrared light emitting diode, to emit infrared light 208 at a particular modulation frequency. For example, the oscillator can operate to cause the power supply voltage to be supplied to IR emitter 206 intermittently, causing light 208 to be modulated at a particular frequency.

In some implementations, control circuitry 204 can control an infrared (IR) detector 210 to sense infrared light 212 at a frequency at which the light is emitted by IR emitter 206. For example, IR detector 210 can sense light that was emitted by IR emitter 206 and that has been reflected back toward proximity sensor 202. Additionally, in some implementations, IR detector 210 and/or control circuitry 204 can provide an output signal based on the amount of light modulated at the frequency emitted by IR emitter 206 that is received at IR detector 210.

In some implementations, proximity sensor 202 can include a connection for receiving an override signal 214 that, when present, can cause IR emitter 206 to emit light. For example, the connection for receiving the override signal 214 can be coupled to an anode of a light emitting diode of IR emitter 206. In such implementations, a device, such as a device to which proximity sensor 202 is connected, can control emission of light from IR emitter 206 such that IR emitter 206 emits IR codes for controlling an electronic device. For example, a smartphone in which proximity sensor 202 is integrated can control a voltage of override signal 214 to cause IR emitter 206 to emit light in any suitable pattern to cause a particular electronic device to perform a particular function.

In some implementations, the connection for receiving override signal 214 can directly receive override signal 214 for controlling IR emitter 206 from a device in which proximity sensor 202 is incorporated (e.g., a mobile device such as a smartphone, a tablet computer, etc.). For example, a mobile device that includes proximity 202 can provide override signal 214 having a particular shape and/or frequency to cause IR emitter 206 to emit light corresponding to a particular code. Alternatively, in some implementations, override signal 214 can control a switch that causes the power supply voltage to be coupled to IR emitter 206, bypassing control circuitry 204.

In some implementations, some or all of control circuitry 204 can be omitted. In such implementations, for example, an oscillator used to drive IR emitter 206 can omitted, and a signal for driving IR emitter 206 and/or IR detector 210 can instead be provided from an external source, such as a mobile device in which proximity sensor 202 is incorporated. In such implementations, the modulation and/or other characteristics of IR light 208 emitted by IR emitter 206 can be controlled based on external control signals regardless of whether proximity sensor 202 is being used to detect the presence or distance of an object or being used to emit a remote control code.

Figure 3:
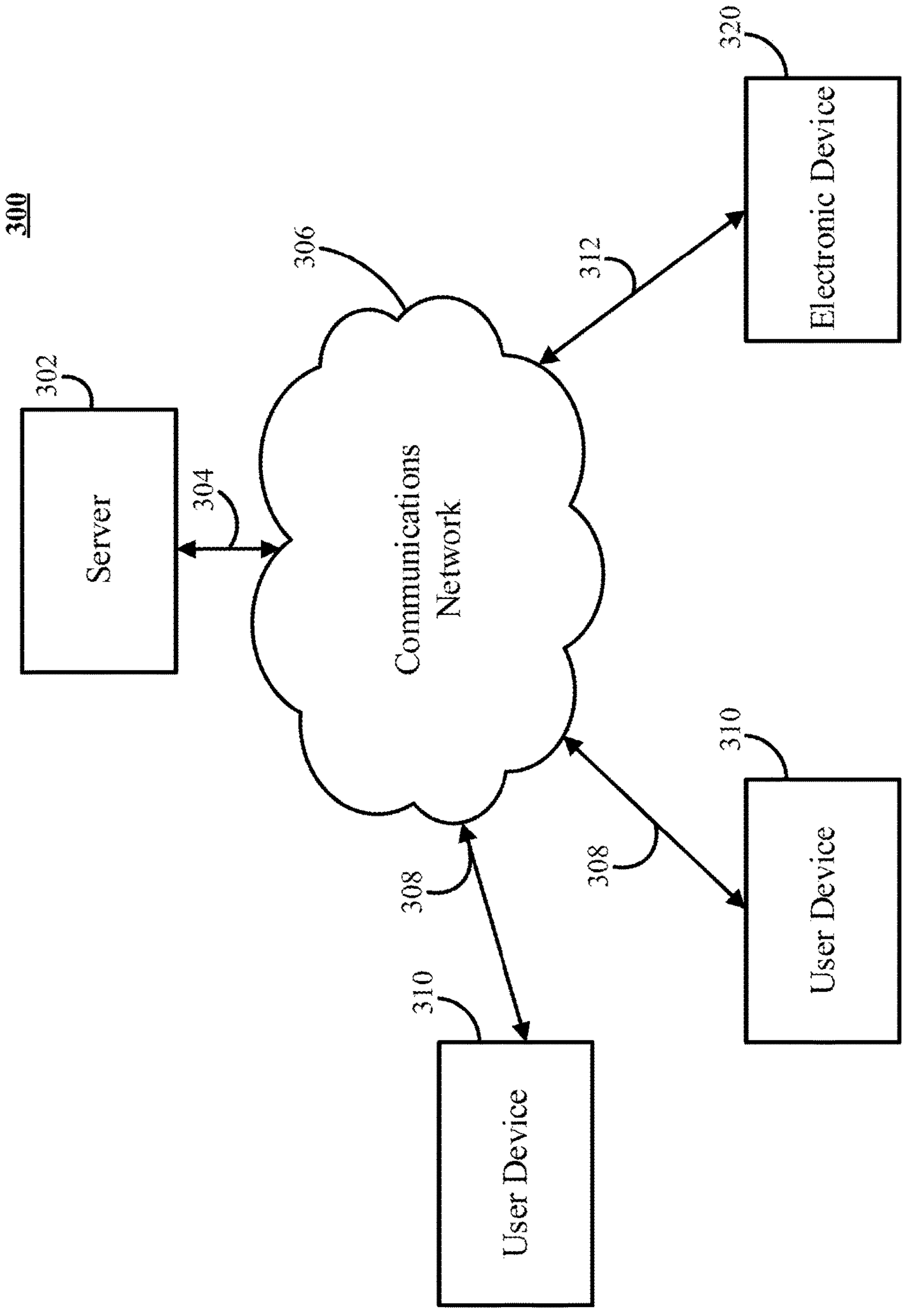
FIG. 3 shows an example of a generalized schematic diagram of a system on which the mechanisms for remote control of electronic devices using a proximity sensor as described herein can be implemented in accordance with some implementations of the disclosed subject matter.

FIG. 3 shows an example 300 of a generalized schematic diagram of a system on which the mechanisms for remote control of electronic devices using a proximity sensor as described herein can be implemented in accordance with some implementations of the disclosed subject matter. As illustrated, system 300 can include one or more user devices 310. User devices 310 can be local to each other or remote from each other. User devices 310 can be connected by one or more communications links 308 to a communications network 306 that can be linked to one or more servers 302 via a communications link 304. Additionally, in some implementations, one or more electronic devices 320 can be connected by one or more communications links 312 to communications network 306.

System 300 can include one or more servers 302. Server 302 can be any suitable server or servers for providing access to the mechanisms described herein for remote control of electronic devices using a proximity sensor, such as a processor, a computer, a data processing device, or any suitable combination of such devices. For example, the mechanisms for remote control of electronic devices using a proximity sensor can be available as an application and/or web page that can be accessed and/or downloaded by user device 310 from one or more of servers 302.

In some implementations, each of user devices 310, server 302 and/or electronic device 320 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 310 can be implemented as a smartphone, a tablet computer, a mobile telephone, a wearable computer, a personal computer, a laptop computer, a digital camera, any other suitable device, or any suitable combination thereof. As another example, electronic device 320 can be implemented as a television, a smart television, a set-top box, a radio, an audio video (AV) receiver, a fan, an air conditioner, any other suitable electronic device, or any suitable combination thereof.

Communications network 306 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 304, 308 and 312 can be any communications links suitable for communicating data among user devices 310, server 302, and/or electronic device 320 such as network links, dial-up links, wireless links, hard-wired links, any other suitable communications links, or any suitable combination of such links. In some implementations, communications link 304 and communications link 312 can be the same communication link or different communication links. For example, an optical signal (such as an infrared signal) can be sent from user device 310 through communications network 306 (e.g., a space between user device 310 and electronic device 320), which can then be received at electronic device 320. In such an example, communications link 304 and communications link 312 are the same (e.g., the optical signal).

Note that, in some implementations, multiple servers 302 can be used to provide access to different mechanisms associated with the mechanisms described herein for remote control of electronic devices using a proximity sensor. For example, system 300 can include an application server 302 that provides copies of and/or access to an application that facilitates remote control of electronic devices using a proximity sensor of a user device. In such an example, the application can be executed to cause the proximity sensor of user device 310 to emit infrared light to produce a coded infrared signal that corresponds to a command for a particular electronic device 320. As another example, system 300 can include a code library server 302 that provides copies of and/or access to codes that correspond to commands for different electronic devices 320. As yet another example, system 300 can include a content discovery server 302 that facilitates discovery of media content available from a media content platform and/or a media content delivery server 302 that responds to requests for the media content by causing the media content to be presented to a user via electronic device 320.

Figure 4:
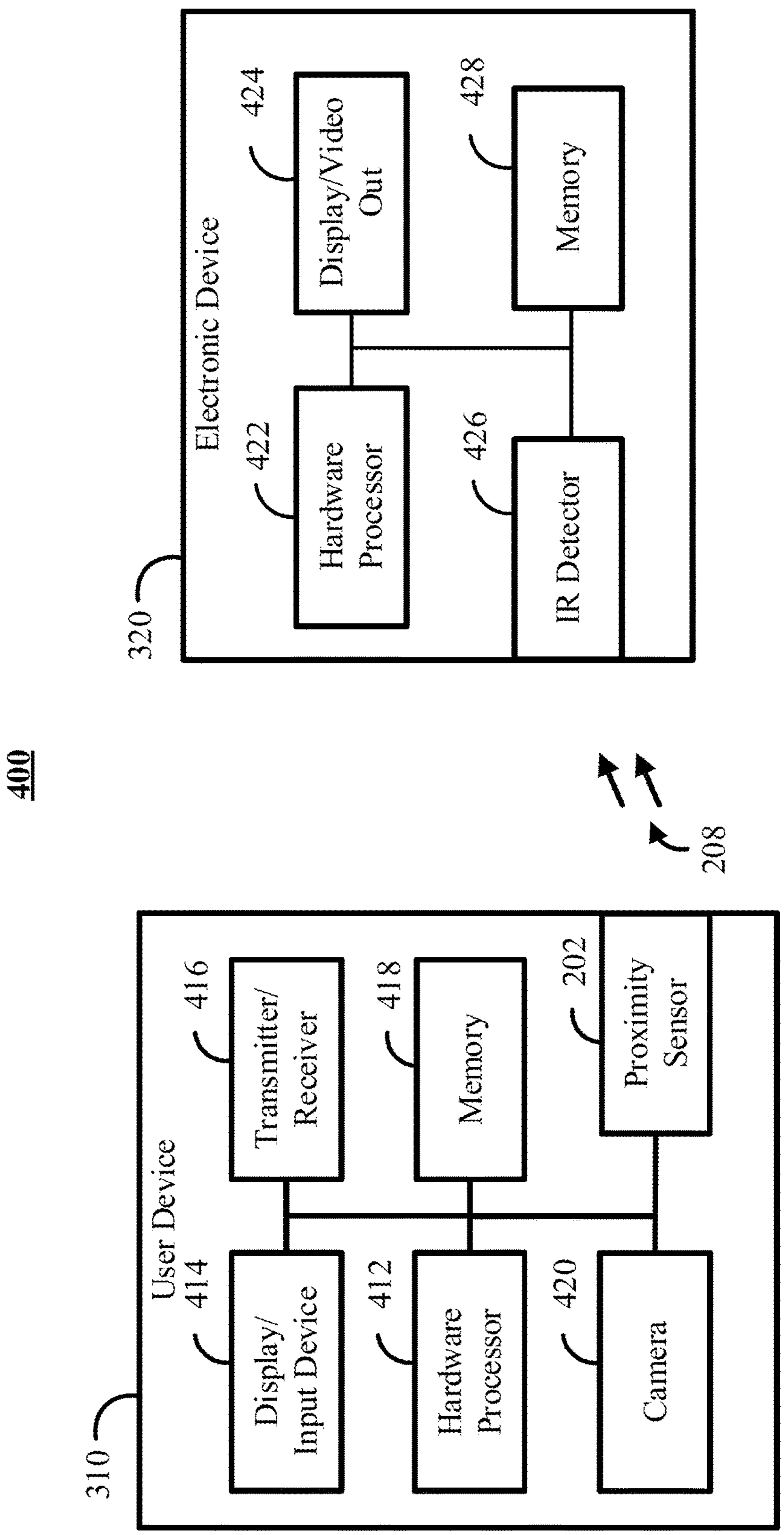
FIG. 4 shows an example of hardware that can be used to implement one or more of the user devices and the electronic devices depicted in FIG. 3 in accordance with some implementations of the disclosed subject matter.

FIG. 4 shows an example 400 of hardware that can be used to implement one or more of user devices 310 and electronic devices 320 depicted in FIG. 3 in accordance with some implementations of the disclosed subject matter. Referring to FIG. 4, user device 310 can include a hardware processor 412, a display/input device 414, a transmitter/receiver 416, memory 418, a digital camera 420 and proximity sensor 202, which can be interconnected. In some implementations, memory 418 can include a storage device (such as a non-transitory computer-readable medium) for storing a computer program for controlling hardware processor 412.

Hardware processor 412 can use the computer program to execute the mechanisms described herein for causing proximity sensor 202 to emit infrared light to produce a coded infrared signal, download and/or access infrared codes for particular electronic devices, etc. In some implementations, hardware processor 412 can send and receive data through communications link 308 or any other communication links using, for example, a transmitter, a receiver, a transmitter/receiver, a transceiver, and/or any other suitable communication device, such as transmitter/receiver 416. Display/input device 414 can include a touchscreen, a flat panel display, a cathode ray tube display, a projector, a speaker or speakers, and/or any other suitable display and/or presentation devices, and can further include a computer keyboard, a computer mouse, a microphone, a touchpad, a voice recognition circuit, a touch interface of a touchscreen, and/or any other suitable input device. In some implementations, digital camera 420 can be any suitable digital camera for capturing one or more objects in a scene. In some implementations, proximity sensor 202 can be used in conjunction with digital camera 420 to determine the depth of objects and/or portions of objects in a scene being captured by digital camera 420. In some implementations, an IR emitter configured for use with a 3D camera (e.g., digital camera 420) can be used in lieu of, or in addition to, proximity sensor 202 to emit infrared signals that can be used to control electronic devices 320. Note that such an infrared emitter can be configured similarly to IR emitter 206 to be controlled by hardware processor 412 of user device 302.

Electronic device 320 can include a hardware processor 422, a display/video output 424, an infrared (IR) light detector 426, and memory 428, which can be interconnected. In some implementations, memory 428 can include a storage device for storing data received through communications link 312 or through other links. The storage device can further include a program for controlling hardware processor 422. In some implementations, hardware processor 422 can receive one or more signals from IR detector 426, and can cause electronic device 320 to perform a function based on whether the received information corresponds to a function specified by the program stored in memory 428. Further, in some implementations, hardware processor 422 can cause audio and/or video to be presented using display/video output 424, where the audio and/or video can be read out from memory 428, received via communications link 312 (e.g., from content server 302, from a broadcaster, from a cable provider, from another electronic device such as a media streaming device, etc.), and/or obtained from any other suitable source. Note that although electronic device 320 depicted in system 400 is described as presenting audio and/or video using display/video output 424, this is merely an example, and electronic device 320 controlled by user device 310 via signals emitted by proximity sensor 202 can be any suitable electronic device that can receive an IR signal corresponding to a command that causes electronic device 320 to perform an action corresponding to the command.

Figure 5:
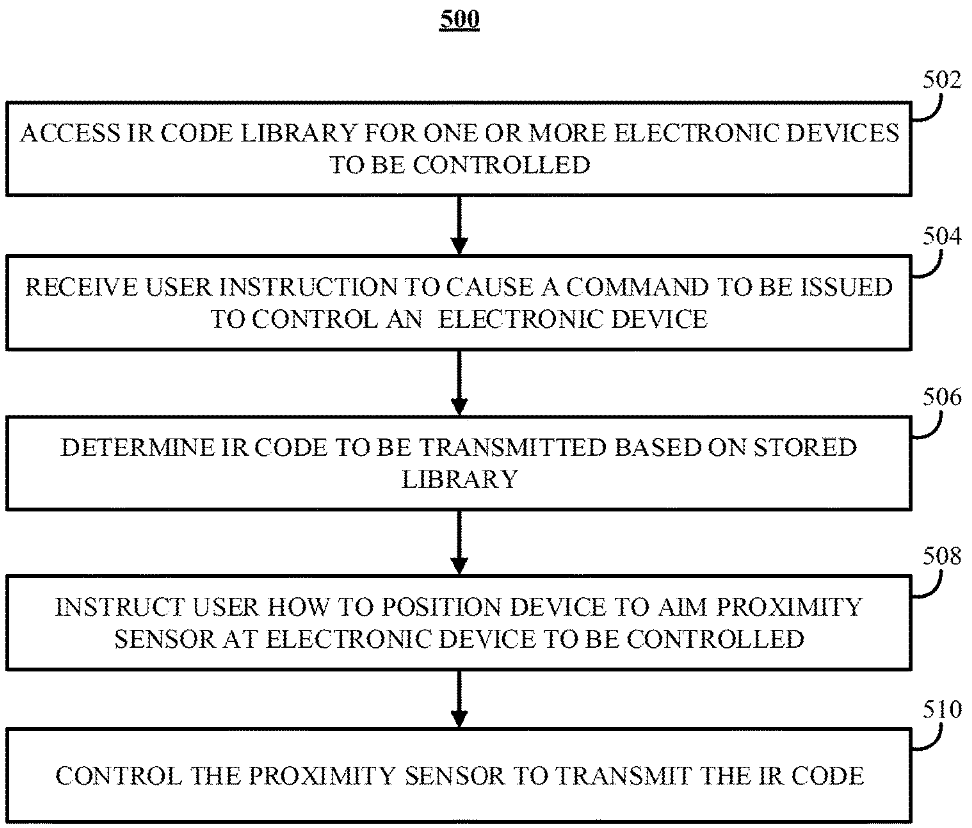
FIG. 5 shows an example of a process for remote control of electronic devices using a proximity sensor in accordance with some implementations of the disclosed subject matter.

Turning to FIG. 5, an example 500 of a process for remote control of electronic devices using a proximity sensor is shown in accordance with some implementations of the disclosed subject matter. As shown in FIG. 5, process 500 can start at 502 by accessing one or more code libraries of infrared (IR) codes that can be used to control one or more electronic devices. In some implementations, the IR codes can be received from any suitable source. For example, as described above, the IR codes can be received as part of an application downloaded and/or accessed using server 302. As another example, the IR codes can be accessed on a web page. In some implementations, the IR codes can be stored in memory of a device executing process 500 (e.g., user device 310). In such implementations, the IR codes can be accessed from memory by an application being executed by user device 310 that performs at least a portion of process 500.

At 504, process 500 can receive a user instruction indicating that a command is to be issued to control an electronic device. In some implementations, the command can be selected using any suitable user interface. For example, the command can be selected using a graphical user interface with one or more user interface elements corresponding to commands that can be issued for one or more electronic devices. As another example, the command can be selected using a voice recognition process to determine that a user has spoken one or more words corresponding to a command that is to be issued to control the electronic device. In some implementations, each electronic device for which IR codes are stored can have a separate user interface for selecting those commands. Additionally or alternatively, in some implementations, user interface elements for multiple electronic devices can be included in the same user interface.

At 506, process 500 can determine an IR code to be transmitted based on a correspondence between the command that was selected at 504 and the IR codes in the IR code library for the electronic device to be controlled. In some implementations, the code can be mapped to a particular portion of a graphical user interface that is selected by the user, and process 500 can determine which code is to be transmitted based on the mapping. Additionally or alternatively, in some implementations, process 500 can determine which electronic device is to be controlled and which action the electronic device is to carry out based on the user instruction received at 504, and using this information process 500 can determine which IR code (or codes) is to be transmitted.

At 508, process 500 can instruct a user of a device (e.g., user device 310) executing at least a portion of process 500 on how to position the device to aim the proximity sensor that is to be used to emit the IR code at the electronic device to be controlled. In some implementations, process 500 can determine a device that is executing at least a portion of process 500, and based on the device, determine a position of the proximity sensor that is to be used to transmit the IR code. In such implementations, based on the position of the proximity sensor, process 500 can provide instructions that indicate to a user how the device is to be positioned in order to aim the proximity sensor at the electronic device. Because the location of proximity sensors is not always obvious, absent instructions a user may aim the device inaccurately, such as by aiming the device as though it were a conventional remote control.

At 510, process 500 can control a proximity sensor (e.g., proximity sensor 202) to transmit the IR code that was determined at 506. In some implementations, process 500 can control the proximity sensor using any suitable technique or combination of techniques. For example, as described above in connection with FIG. 2, process 500 can control proximity sensor 202 by causing a device executing process 500 to alternately provide and inhibit an override signal to proximity sensor 202 to control operation of IR emitter 208 to transmit the IR code. As another example, as described above in connection with FIG. 2, process 500 can control proximity sensor 202 by causing a device executing process 500 to provide a power supply signal and alternately provide and inhibit an override signal to proximity sensor 202 (e.g., to control operation of a switch in proximity sensor 202) to control operation of IR emitter 208 to transmit the IR code. As yet another example, as described above in connection with FIG. 2, process 500 can control proximity sensor 202 by causing a device executing process 500 to provide a power supply signal and a clock signal to directly control IR emitter 208 to transmit the IR code rather than to transmit a signal modulated for detecting proximity.

In some implementations, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 412 and/or hardware processor 422) to execute the mechanisms described herein. For instance, these mechanisms can encompass a computer program written in a programming language recognizable by user device 310, and/or server 302 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIG. 5 can be executed or performed in any order or sequence not limited to the order and sequence shown and described in the figures. Also, some of the above steps of the processes of FIG. 5 can be executed or performed substantially simultaneously where appropriate or in parallel to reduce latency and processing times. Furthermore, it should be noted that the process described in connection with FIG. 5 is provided as an example only. At least some of the steps shown in this figures may be performed in a different order than represented, performed concurrently, or omitted.

It should also be noted that, as used herein, the term mechanism can encompass hardware, software, firmware, or any suitable combination thereof.

Accordingly, methods, systems, and media for remote control of electronic devices using a proximity sensor are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for remote control of electronic devices, the system comprising:
- a proximity sensor that is configured to (i) emit infrared light having specific properties using an infrared emitter and (ii) detect reflected light having the specific properties using an infrared detector to determine proximity of the sensor to an object; and
- a hardware processor that is configured to:
  - detect a user instruction to cause a command to be issued to control an electronic device; and
  - in response to detecting the user instruction, cause the proximity sensor to emit an infrared signal corresponding to a code instead of emitting infrared light having the specific properties used in detecting proximity, wherein the code corresponds to the command to be issued to control the electronic device.

2. The system of claim 1, wherein the proximity sensor further comprises control circuitry that causes the infrared emitter to emit the infrared light having specific properties in response to a power supply signal being supplied to the proximity sensor.

3. The system of claim 1, wherein the proximity sensor is incorporated in a user device, and wherein the hardware processor is programmed to provide a user interface on a display of the user device that provides instructions for a user indicating how to position the user device to aim the proximity sensor at the electronic device.

4. The system of claim 1, wherein the system further comprises memory, and wherein the hardware processor is further programmed to:
- receive a plurality of codes from a remote server, wherein the code is included in the plurality of codes; and
- cause the plurality of codes to be stored in the memory.

5. The system of claim 1, wherein the infrared emitter comprises a light emitting diode.

6. The system of claim 2, wherein the proximity sensor further comprises a connection that is configured to receive an override signal that is used to control the infrared emitter, and wherein the at least one signal provided to the proximity sensor includes the override signal.

7. The system of claim 4, wherein the hardware processor is further programmed to determine the code to be transmitted that corresponds to the command from the plurality of codes associated with the electronic device.

8. A method for remote control of electronic devices, the method comprising:

detecting, using a hardware processor, a user instruction to cause a command to be issued to control an electronic device; and in response to detecting the user instruction, causing a proximity sensor to emit an infrared signal corresponding to a code instead of emitting infrared light having the specific properties used in detecting proximity, wherein the code corresponds to the command to be issued to control the electronic device and wherein the proximity sensor is configured to (i) emit infrared light having specific properties using an infrared emitter and (ii) detect reflected light having the specific properties using an infrared detector to determine proximity of the sensor to an object.

9. The method of claim 8, wherein the proximity sensor further comprises control circuitry that causes the infrared emitter to emit the infrared light having specific properties in response to a power supply signal being supplied to the proximity sensor.

10. The method of claim 8, wherein the proximity sensor is incorporated in a user device, and wherein the method further comprises providing a user interface on a display of the user device that provides instructions for a user indicating how to position the user device to aim the proximity sensor at the electronic device.

11. The method of claim 8, further comprising:

receiving a plurality of codes from a remote server, wherein the code is included in the plurality of codes; and causing the plurality of codes to be stored in the memory.

12. The method of claim 8, wherein the infrared emitter comprises a light emitting diode.

13. The method of claim 9, wherein the proximity sensor further comprises a connection that is configured to receive an override signal that is used to control the infrared emitter, and wherein the at least one signal provided to the proximity sensor includes the override signal.

14. The method of claim 11, further comprising determining the code to be transmitted that corresponds to the command from the plurality of codes associated with the electronic device.

15. A non-transitory computer-readable medium containing computer executable instructions that, when executed by a processor, cause the processor to perform a method for remote control of electronic devices, the method comprising:

detecting a user instruction to cause a command to be issued to control an electronic device; and in response to detecting the user instruction, causing a proximity sensor to emit an infrared signal corresponding to a code instead of emitting infrared light having the specific properties used in detecting proximity, wherein the code corresponds to the command to be issued to control the electronic device and wherein the proximity sensor is configured to (i) emit infrared light having specific properties using an infrared emitter and (ii) detect reflected light having the specific properties using an infrared detector to determine proximity of the sensor to an object.

16. The non-transitory computer-readable medium of claim 15, wherein the proximity sensor further comprises control circuitry that causes the infrared emitter to emit the infrared light having specific properties in response to a power supply signal being supplied to the proximity sensor.

17. The non-transitory computer-readable medium of claim 15, wherein the proximity sensor is incorporated in a user device, and wherein the method further comprises providing a user interface on a display of the user device that provides instructions for a user indicating how to position the user device to aim the proximity sensor at the electronic device.

18. The non-transitory computer-readable medium of claim 15, wherein the method further comprises:

receiving a plurality of codes from a remote server, wherein the code is included in the plurality of codes; and causing the plurality of codes to be stored in the memory.

19. The non-transitory computer-readable medium of claim 15, wherein the infrared emitter comprises a light emitting diode.

20. The non-transitory computer-readable medium of claim 16, wherein the proximity sensor further comprises a connection that is configured to receive an override signal that is used to control the infrared emitter, and wherein the at least one signal provided to the proximity sensor includes the override signal.

21. The non-transitory computer-readable medium of claim 18, wherein the method further comprises determining the code to be transmitted that corresponds to the command from the plurality of codes associated with the electronic device.

* * * * *